April 19, 1966 H. B. GUSTAFSON 3,247,105
PROCESS AND APPARATUS FOR PRODUCING DENSE SLUDGES
Filed Jan. 11, 1963 2 Sheets-Sheet 1

United States Patent Office 3,247,105
Patented Apr. 19, 1966

3,247,105
PROCESS AND APPARATUS FOR PRODUCING
DENSE SLUDGES
Hilding B. Gustafson, Tucson, Ariz., assignor to Fuller
Company, Catasauqua, Pa., a corporation of Delaware
Filed Jan. 11, 1963, Ser. No. 250,813
10 Claims. (Cl. 210—46)

This invention relates to a method and apparatus for producing dense sludges from chemical precipitation operations. More specifically the invention relates to the production of dense sludges containing calcium, magnesium and/or aluminum.

It is an object of this invention to provide an improved method of producing sludge from precipitation reactions which results in a very dense, heavy sludge.

Another object is to provide an improved method of producing sludge which results in a very dense, heavy sludge despite the presence of materials which in present day practice prohibit the formation of a dense sludge.

Another object is to provide an improved method and apparatus for producing a dense sludge containing magnesium and/or aluminum.

Another object is to provide a method for producing a dense, flocculated softening sludge relatively rich in magnesium, which settles rapidly.

Other objects of the invention will become apparent from the description and claims which follow.

Sludges from chemical precipitating reactions, such as, for example, water softening sludges, exhibit a great variability in respect to sludge volume and dry solids by weight per unit volume of settled sludge. Precipitates containing only calcium carbonate are relatively dense and crystalline. The settled sludge is relatively small in volume and there is a relatively large weight of dry solids per unit volume of settled sludge.

Figure 1:
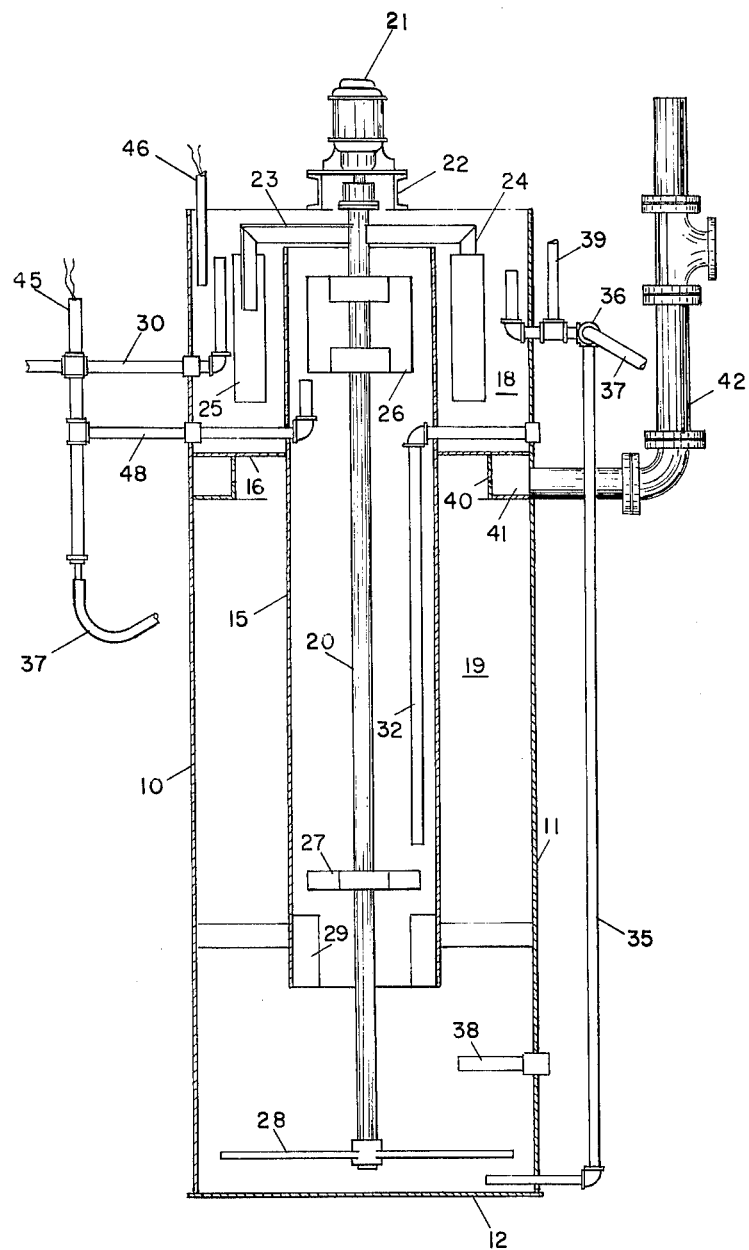

This desirable condition changes, however, when magnesium and/or aluminum are present in the sludge along with calcium carbonate. It is believed generally, that the presence of magnesium and/or aluminum renders the sludge relatively light, voluminous and low in dry solids per unit volume of settled sludge. The literature evidence suggests that the lightness characteristic becomes emphasized as the proportion of magnesium and/or aluminum in the sludge increases relative to calcium. This is demonstrated, for example, by Black, Disposal of Softening Plant Wastes, Journal American Water Works Association, September 1949, page 819. FIGURE 1 thereof shows the relationship of the percentage by weight and percentage by volume of the solids of two sludges, one a crystalline calcium carbonate sludge precipitated from a low-magnesium water, and the other a bulky flocculent sludge precipitated from a high-magnesium water and coagulated with alum.

Various methods have been devised to cope with the problem of light, voluminous sludges due to the presence of magnesium and/or aluminum, by reducing in one way or another the magnesium and/or aluminum content of the sludge. Some of these methods are described by Eidsness and Black, Carbonation of Water Softening Plant Sludge, Journal American Water Works Association, October 1957, page 1343.

The general belief that the presence of magnesium and aluminum results in light, voluminous sludges with a low dry solids content per unit volume of settled sludge, is correct insofar as present practices of precipitating calcium carbonate, magnesium hydroxide and aluminum hydroxide are concerned. However, I have found that sludges rich in magnesium and/or aluminum need not be light and voluminous, and that the method by which these sludges are produced determines whether they are relatively light or relatively dense.

My novel method of producing dense sludges with a high magnesium and/or aluminum content relies on the recycling of sludge from a great many reactions, the sludge being treated with lime or some other suitable precipitant during each cycle, followed by reaction with the proper amount of additional raw water.

I have discovered that when this recycling of the settled sludge secured from a precipitation reaction to the reaction zone, with addition of precipitant to this return sludge, followed by reaction with the proper amount of additional raw water, is constantly repeated, it results, after an initial period, in a steady increase in the apparent density of the settled sludge such that an originally light, voluminous sludge becomes relatively dense. I have found that with increase in the number of such cycles, the density of the sludge increases without corresponding increase in volume.

With my process, the solids concentration in the reaction zone will be many times greater than has been usual in the so-called "high rate" solids contact processes. These high solids concentrations will result from at least fifty, but preferably many more cycles. In contrast thereto, the solids concentration in a conventional high rate solids contact unit results from 5–10 cycles. As will be seen from the test results given below, with this low concentration the sludge volume increases steadily as more solids are added. This conventional recycling based on 5–10 cycles has given no indication that voluminous sludges become dense by repeating the cycling many more times. Nor do the apparatus available at present, including the so-called "high rate" solids contact units, permit building up of a sludge of comparable density.

The nature of natural waters is such that when said waters are reacted with lime, the resulting sludge always contains more calcium carbonate than magnesium hydroxide. An extreme case, sometimes approached but never actually occurring, would involve a water containing no calcium and only magnesium bicarbonate. The lime reaction in this case is as follows:

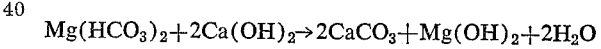

$$Mg(HCO_3)_2 + 2Ca(OH)_2 \rightarrow 2CaCO_3 + Mg(OH)_2 + 2H_2O$$

From this reaction it can be seen that the sludge composition is 200 parts calcium carbonate and 58 parts magnesium hydroxide or 77% calcium carbonate and 23% magnesium hydroxide. In water softening such a sludge must be considered as extremely high in magnesium content.

A water having methyl orange alkalinity 136, calcium 180, magnesium 162 (all as calcium carbonate) results, when treated with sufficient lime, in reactions as follows:

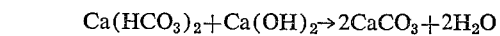

$$Ca(HCO_3)_2 + Ca(OH)_2 \rightarrow 2CaCO_3 + 2H_2O$$

and

$$MgSO_4 + Ca(OH)_2 \rightarrow Mg(OH)_2 + CaSO_4$$

The composition of the sludge resulting from the above is 272 parts calcium carbonate+(0.58×162)=94 parts magnesium hydroxide or 74% calcium carbonate and 26% magnesium hydroxide.

When 500 ml. of this water were treated with enough lime to accomplish the above reactions, and with 0.5 p.p.m. of a synthetic polymer formed from the polymerization of acrylamide, sold by the Dow Chemical Co. under the trademark "Separan," to accomplish flocculation, the sludge volume measured after 5 minutes settling was 50 ml. The settled water was decanted, leaving the sludge in a 500 ml. calibrated beaker. The necessary lime was added as a 10 g./l. slurry to the sludge and mixed, next 400 ml. of the raw water of the above analysis were added, the sample was mixed 10 minutes, then 0.5 p.p.m. Separan was added, followed by an additional mix of 1 minute. The sample then was settled 5 minutes and the sludge volume read. This process was repeated 51 times with the following results:

| Cycle | 5-Min. Sludge Volume (ml.) | 5-Min. Sludge Calculated Dry Solids/l. (grams) |
| --- | --- | --- |
| 1 | 50 | 3.66 |
| 4 | 87 | 7.1 |
| 10 | 155 | 9.65 |
| 15 | 163 | 13.7 |
| 20 | 162 | 18.2 |
| 25 | 158 | 23.4 |
| 30 | 160 | 27.7 |
| 35 | 163 | 31.5 |
| 40 | 163 | 36.0 |
| 45 | 158 | 41.8 |
| 51 | 158 | 47.2 |

It is seen that up to the 15th cycle the sludge volume increased steadily to slightly over three times its original value, but that it remained substantially unchanged thereafter, with a small reduction during the last 10 cycles. In contrast thereto, the weight of the dry solids per liter increased substantially uniformly through the entire runs and the end value was almost 13 times the initial value. This example clearly evidences that my process results in a steady increase in the apparent density of the settled sludge, whereby an originally light, voluminous sludge becomes quite dense.

In increasing the density by this cycling, I prefer for best results that the cycling be in such increments that the sludge does not increase in volume but only in weight. I have found that when adding in each cycle not more than 10% of sludge solids to the weight of sludge solids being recycled, the desired result is obtained.

I have noted density increases also when the return sludge is diluted with the additional raw water prior to addition of the lime. I have also found that for a water of a given composition, a reaction occurring at a concentration of mineral matter, particularly such as results in precipitation when treated with a precipitant, of 1000 p.p.m. produces a denser sludge than a reaction occurring at a concentration of 100 p.p.m., and a reaction occurring at a concentration of 10,000 p.p.m. produces a denser sludge than one occurring at 1000 p.p.m.

To test the influence of aluminum on the process, a synthetic water was prepared containing 500 p.p.m. of magnesium bicarbonate in calcium carbonate terms. This water was treated with lime (the amount used was about 800 p.p.m. Ca(OH)$_2$) and the sludge cycled as previously described; however, instead of using 0.5 p.p.m. Separan, 17 p.p.m. of filter alum was used as coagulant. The results were as follows:

| Cycle | Sludge Volume After 15-min. Settling (Percent) | Calculated Dry Solids/l. of Sludge After 15-min. Settling (grams) |
| --- | --- | --- |
| 8 | 31 | 33 |
| 10 | 32 | 41 |
| 14 | 34 | 52 |
| 18 | 36 | 63 |

The preparation of dense sludges by the laboratory technique described above is time-consuming. Dense sludges can be obtained much faster by reacting initially at a high concentration and then cycling this sludge to further increase the density.

In carrying out this concept, a relatively dense alumina sludge was prepared by reacting a 400 g./l. solution of filter alum with sufficient concentrated, reagent grade aqua ammonia to fully precipitate the alumina. The product of this reaction was a thick paste. This paste was washed by successive decantations with 785 ml. tap water using Separan to render the alumina coarsely flocculant. The decantations, which removed the soluble ammonium sulfate, were carried out in a 1 liter graduated beaker, the volume of 400 g./l. filter alum was 50 ml. and the volume of alumina sludge measured after 5 minutes settling was 215 ml. Once the alumina was rendered flocculant by use of Separan, it settled rapidly, settling rates of 8″/min. being noted with the water at 75° F.

To the settled, decanted sludge was added 1 ml. of the 400 g./l. filter alum solution, next 1200 ml. of raw water having sufficient alkalinity to ensure the precipitation of the aluminum sulfate in the solution. It will be understood that if the alkalinity of a raw water is not sufficient for complete precipitation of the aluminum sulfate, lime or other alkaline precipitant can be added. The mixture was then stirred 2 minutes, Separan added, followed by 1 minute stirring, and then settled. After 5 minutes settling, the sludge volume was measured. The clear, settled liquid was decanted at this time, leaving the sludge in the beaker. The process then was repeated a total of eight times.

| | Prior to Cycling | After 8 Cycles |
| --- | --- | --- |
| Sludge Volume in 5 Minutes ml. | 215 | 215 |
| Calculated weight of Al(OH)$_3$/liter of 5-min. settled sludge g. | 24.1 | 28 |

It is seen that the volume of the dense alumina sludge prepared in the manner described and used as the starting material for cycling did not change during 8 cycles, whereas during these 8 cycles the weight of Al(OH)$_3$/liter increased about one-sixth of the weight prior to cycling. By starting the cycling with a relatively dense sludge, the point where the weight of the sludge solids increases while the sludge volume remains stationary can be reached practically immediately.

I prefer to use organic flocculants, such as Separan, or a material with properties similar to Separan, or activated silica for rendering and keeping the sludge flocculant. Tests have shown that Separan and activated silica both are effective in my process. When the end product of the process is a potable water, I use Separan NP10, Potable Grade, or similar material approved by the United States Health Service Technical Advisory Committee.

To obtain a flocculent sludge, the flocculants are added to the mixture of liquid and precipitated solids prior to settling of the solids.

The dense sludges prepared in the manner described above have important advantages over sludges produced by present means, to wit:

(1) There is less wastage of treated water.
(2) The sludge disposal problem is minimized as the volume to be disposed is considerably less.
(3) The sludges settle more rapidly, which permits using smaller clarification area. For example, with a dense, flocculated softening sludge relatively rich in magnesium and treating a water of relatively high magnesium content, I have observed separation rates as high as 12″/min., equaling 7.5 gallons/sq. ft./min. This compares with the rise rate of about 1.5 gallons/sq. ft./min. in solids contact units treating waters of high magnesium content.
(4) The reactions are more complete and the chemicals better utilized when the reaction occurs in the presence of a dense sludge. The reactions are also faster, so that smaller reaction volume can be used.
(5) Refractory substances, such as phosphates, which interfere most severely with the performance of conventional softening equipment, interfere to a much lesser degree when dense sludges are present.

The apparatus of my invention is relatively simple. It includes a mixing and reaction chamber and a clarification chamber, which may be arranged in a common basin or in separate basins, mixing and flocculating means, and means for returning sludge from the clarification chamber to the mixing and reaction chamber.

In the drawings two apparatus according to the invention are shown diagrammatically for purposes of illustration.

Figure 2:
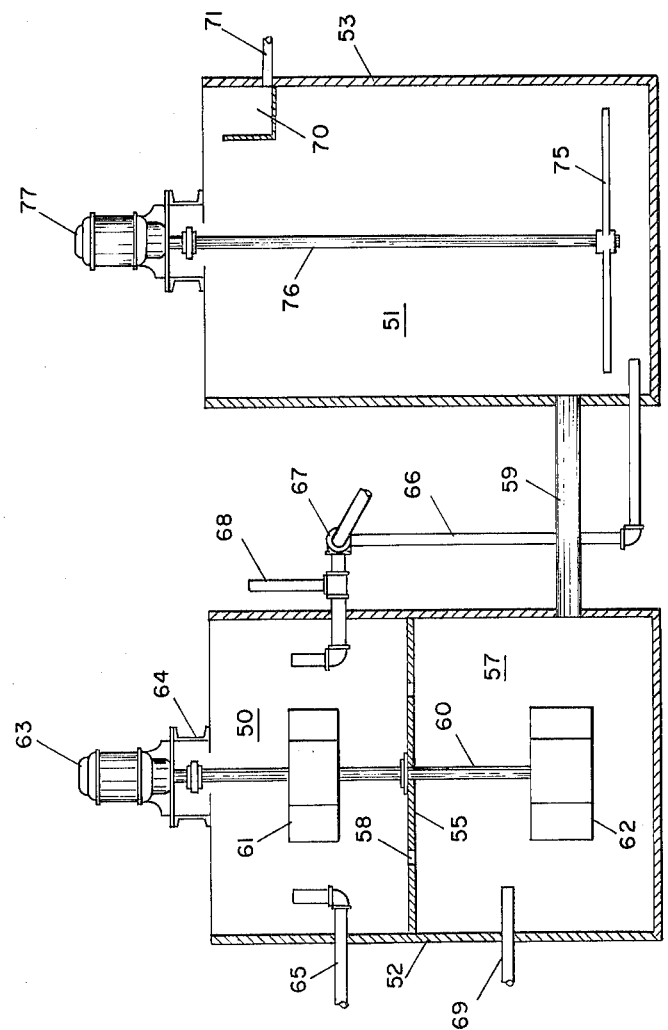

FIGURE 1 shows in vertical section a plant according to the invention with the mixing and reaction chamber and the clarification chamber in a common basin; and FIGURE 2 shows in vertical section a plant according to the invention with the mixing and reaction chamber and the clarification chamber in separate basins.

The plant of FIGURE 1 comprises a tank 10 which may have any suitable configuration, but preferably is round, with an upstanding wall 11 and a flat bottom 12. Centrally aligned in the tank is a tubular partition 15 which extends from an elevation a short distance above the maximum liquid level within the tube downward, as shown.

A horizontal partition 16 extends across the annular space around the tubular partition 15, and separates an upper mixing and reaction chamber 18 from a lower clarification chamber 19, whose lower portion extends across the entire cross sectional area of tank 10.

A shaft 20 is axially arranged in the tank 10 and is affixed to the output shaft of a motor-reducer 21, which may be supported by any suitable means, such as a bridge or beam 22 across the tank 10. The shaft 20 extends through the tube 15 and into the lower portion of the tank to an elevation spaced above the bottom 12. Affixed to the shaft 20, at an elevation above the upper rim of the tube 15, are horizontal arms 23; vertical arms 24, to which mixing blades 25 are affixed, extend from the arms 23 into the chamber 18, as shown. Within tube 15 a mixing rotor 26 is affixed to the shaft 20 subjacent the upper end of the tube, and a flocculating rotor 27 near its lower end. A stirrer 28 extends from the shaft 21 across the lower portion of the tank 10.

A plurality of baffles 29 are provided below the flocculator 27 in the tube 15.

A raw liquid inlet conduit 30 leads from a source of raw liquid to be treated, not shown, to the mixing and reaction chamber 18. A coagulant pipe 32 discharges into a lower portion of the tube 15, adjacent the flocculating rotor 27. A sludge recirculation pipe 35 leads from the tank at an elevation below the stirrer 28 and extends upward outside the tank, then re-enters the tank and discharges into the mixing and reaction chamber 18. Any suitable means may be used for elevating the sludge from the bottom portion of the tank to the chamber 18. Preferably, and as shown, an ejector 36 is provided therefor, which may be operated by raw liquid from a branch 37 of the raw liquid conduit 30. A sludge blowdown pipe 38 leads from a lower portion of tank 10. Precipitant for the treatment of the raw liquid is introduced through a conduit 39, leading from a source of precipitant, such as a feeder, not shown, into the sludge recirculation pipe 35 downstream of ejector 36, just ahead of the point of entry of pipe 35 into the mixing and reaction chamber. In this manner the precipitant is mixed with the recirculated sludge before it is contacted with the main portion of the raw liquid.

Clarified treated liquid is withdrawn from the upper portion of the clarifying chamber 19 through orifices 40 into a launder 41 which is affixed to the inside wall of the tank and the lower face of the horizontal partition. A clarified liquid outlet conduit 42 leads from launder 41 upward to an elevation slightly below the upper rim of the tube 15 and establishes the maximum liquid level in the tube 15.

In operation precipitant and an appropriate portion of recycled sludge are jointly discharged into the mixing and reaction chamber, where they are mixed with the raw liquid entering through inlet conduit 30 by rotation of the mixing arms 23–24 with their blades 25. A high concentration of precipitated solids is maintained in the mixing and reaction chamber, so that the reactions proceed very rapidly. The mixture of liquid under treatment, reagents and recycled sludge overflows the upper edge of the tubular partition 15 and spills down on the surface of the contents of the tube. Further mixing is effected by rotor 26, and the precipitating reactions are substantially completed while the mixture flows down the tube 15. In the lower portion of the tube the flocculant, such as Separan or activated silica, is added to and incorporated in the mixture by the flocculator 27. Baffles 29 prevent the flocculator from merely rotating the liquid and assist in causing agitation for good mixing and flocculation.

Due to the large cross sectional area of the lower portion of the clarification chamber, the flow velocity of the mixture entering the clarification chamber 19 is considerably reduced, and the sludge separates from the treated liquid and settles in the lower portion of the tank 10, while the liquid rises toward and into the launder 41 and is withdrawn through outlet conduit 42. Stirrer 28 keeps the sludge in a semi-fluid condition, so that it can be recycled by means of ejector 36 through the recirculation pipe 35 to the mixing and reaction chamber 18. Obviously, the denser the sludge becomes by continued recycling, the shorter the time required for its settling.

The shaft 20 is rotated at a relatively slow speed, such as about 5 r.p.m.

When used for precipitation reactions involving lime and/or soda ash as precipitants, the invention lends itself readily to automatic control from the ratio of the conductivity prevailing in the mixing and reaction chamber and that of the raw liquid, as described and claimed in my co-pending application, Serial No. 247,144, filed December 26, 1962. In such case the electrodes 45 and 46 of a pair of conductivity cells are installed so as to extend into the raw liquid conduit 30 and into the mixing and reaction chamber 18, respectively. The conductivity cells are connected electrically to a conductivity ratio controller, not shown, and transmit thereto signals corresponding to the conductivities measured by their electrodes. The conductivity ratio controller starts and stops the flow of precipitant through conduit 39 in accordance with the electrical signals received from the electrodes 45 and 46 to maintain the conductivity ratio for which it is set. This ratio is set so as to ensure that an appreciable excess of precipitant is fed to the mixing and reaction chamber over what is required for treatment of the raw liquid entering the mixing and reaction chamber.

If it is desired to utilize the excess precipitant for treating an additional amount of raw liquid, a branch conduit 48, leading from the raw liquid inlet conduit 30, and discharging in tube 15 adjacent the rotor 26, may be provided.

The conductivity ratio control forms no part of this invention, but is mentioned only as one particularly advantageous control of the feed of certain precipitants which can be applied in connection with my new process and apparatus. It should, however, be understood that the invention is not limited to this knid of automatic control, but can be carried out with any other suitable type of control or with manual adjustment of the feed of precipitants to the reaction chamber.

In FIGURE 2 the mixing and reaction chamber 50 and the clarification chamber 51 are arranged in separate tanks 52 and 53. A horizontal partition 55 extends across the tank 52, separating therein the mixing and reaction chamber 50 from a lower flocculation chamber 57. The two chambers are in hydraulic communication through ports 58 in partition 55. A conduit 59 connects the flocculation chamber 57 with the clarification chamber 51, as shown.

A shaft 60 is axially aligned in tank 52 and extends through the upper chamber 50 and into the lower chamber 57 and carries a mixing rotor 61 in the chamber 50 and a flocculating rotor 62 in the chamber 57. The shaft 60 is connected to the output shaft of a motor-reducer 63 which may be supported by any suitable means, such as a bridge 64 across tank 52. The raw water is introduced into the mixing and reaction chamber 50 through a raw water conduit 65. Sludge is recycled from the bottom portion of the clarification chamber 51 through a sludge recirculation line 66. Suitable means, such as a pump, or an ejector 67, operated by raw liquid, are provided to convey the recycled sludge to the mixing and reaction chamber 50. Precipitant, conveyed through a pipe 68, is discharged into the sludge recirculation line 66, so that recycled sludge and precipitant jointly enter chamber 50, where they are mixed with the raw water by rotation of rotor 61. The mixture then enters the flocculation chamber 57 through ports 58. Flocculant, such as, for example, Separan, is admitted to the chamber 57 through a conduit 69 and is incorporated in the treated liquid-sludge mixture by rotation of flocculator 62. The flocculated mixture passes into the clarifier 51 through conduit 59. The sludge settles to the bottom of the clarifier, while the clarified treated liquid rises to and flows into the launder 70, from which it is withdrawn through an effluent conduit 71. The sludge is maintained in a sufficiently fluid condition, so that it can be recycled to the mixing and reaction chamber, by a stirring bar 75, which is affixed to a shaft 76, driven by a motor-reducer 77 at a suitable speed.

The operation of this embodiment of the invention can also be regulated by conductivity ratio control in the same manner and by the same means as the embodiment of FIGURE 1.

It is seen that the high magnesium and/or aluminum sludges produced in accordance with my invention have a far greater density than similar sludges produced by present day methods; in fact, the settling velocity of my sludges is at least five times that of sludges of the same chemical composition obtained in high rate solids contact units. It should be understood, however, that the invention is not applicable only to sludges containing magnesium and/or aluminum, but can be used with great advantage to increase the apparent density of pure calcium carbonate sludges to a value far above any achieved by present methods of precipitation.

In view of the substantially straight line increase in the weight of the dry solids per liter, without increase in sludge volume, it appears to be certain that further cycling will steadily increase the apparent density of the settled sludge over what has been achieved so far. These highly desirable results with all their inherent advantages are attained in simple and economic manner.

Many modifications of the process and apparatus described herein can be made without departing from the spirit and scope of the invention. Thus, while the flocculating step is desirable for best operations, the process can, under favorable conditions, be carried out without flocculation, and in such case the flocculation chamber and the flocculator will, of course, be omitted. It will also be obvious to those skilled in the art that in relatively large basins it may be desirable to arrange the mixing and reaction chamber in the lower portion of the tank and the clarification chamber in the upper portion, in view of the weight of the contents of the mixing and reaction chamber.

I claim:
1. Apparatus for treating liquids containing magnesium and/or aluminum by chemical precipitation to obtain a sludge of predetermined high density, comprising a mixing and reaction chamber, a flocculation chamber and a clarification chamber, said chambers being separate but in hydraulic communication for sequential flow therethrough, means for introducing liquid to be treated into said mixing and reaction chamber, means for introducing precipitant into said mixing and reaction chamber, means for withdrawing treated clarified liquid from said clarification chamber, conduit means for continuously recycling sludge settling to the bottom of said clarification chamber to said mixing and reaction chamber, means for mixing the precipitant and recycled sludge with the raw liquid in the mixing and reaction chamber, means for introducing a flocculant into said flocculation chamber and mixing it therein with the sludge-liquid mixture leaving said mixing and reaction chamber to flocculate said sludge, said clarification chamber affording a quiescent settling area wherein the treated liquid separates from the flocculent sludge to be recycled, and means for withdrawing sludge in excess of that required for recycling to reach and maintain said predetermined sludge density.

2. Apparatus for treating liquids containing magnesium and/or aluminum by chemical precipitation to obtain a sludge of predetermined high density, comprising a tank, a tube axially aligned in said tank and separated from the tank wall by an annular space, a horizontally extending partition separating said annular space into an upper reaction chamber in hydraulic communication with said tube over its upper edge, and a lower clarification chamber in hydraulic communication with said tube through its lower end, an effluent conduit leading from said clarification chamber and establishing the normal liquid level in said tube, said tube extending from an elevation above said normal liquid level downward and having its lower end spaced from the bottom of said tank, means for introducing liquid to be treated into said mixing and reaction chamber, means for continuous recycling of sludge settling to the bottom of said tank to said mixing and reaction chamber, means for introducing precipitant into said mixing and reaction chamber, mixing means in said mixing and reaction chamber, a flocculator in said tube, and means for rotating said mixing means and said flocculator, said flocculator being so positioned in said tube as to flocculate the mixture of liquid and sludge flowing from said mixing and reaction chamber over the upper edge of said tube prior to any settling of sludge from said mixture, and means for withdrawing sludge in excess of that required for said continuous recycling.

3. In the treatment of a body of liquid containing mineral matter to remove such matter and produce a clarified liquid by chemical precipitation reaction wherein the liquid is treated with a precipitant in a mixing and reaction zone to precipitate a lower density sludge in a clarification zone, a process for preparing a sludge of a predetermined high density from the lower density sludge comprising:
 (a) withdrawing the lower density sludge from the lower portion of the clarification zone and return recycling said sludge to the body of liquid in the mixing and reaction zone;
 (b) adding to the sludge during each recycling precipitant and additional untreated liquid;
 (c) causing flocculation of the mixture of recycled and newly precipitated sludge;
 (d) settling out the flocculated solids from the liquid in the clarification zone and withdrawing clarified liquid during each cycle;
 (e) retaining all the sludge in the process;
 (f) continuing the withdrawal and recycling under addition of precipitant and untreated water at least until a condition is reached wherein the sludge volume remains constant while the weight continues to increase, and
 (g) thereafter withdrawing from the process sludge no longer required to maintain the predetermined high density.

4. A process according to claim 3, wherein said lower density sludge is produced by chemical precipitation of solids from the raw liquid.

5. A process according to claim 3, including also the step of flocculating the sludge during its recycling.

6. A process according to claim 3, wherein the liquid containing hardness imparting substances is a raw water containing at least one of the group comprising magnesium and aluminum.

7. A process according to claim 6, wherein said conditions of constant sludge volume with increasing weight of sludge solids are reached by conducting said recycling in such manner that the recycled sludge is proportioned to said further precipitated sludge so that in each cycle the maximum addition of sludge solids to the weight of sludge solids being recycled is about 10%.

8. A process according to claim 6, wherein the recycled and newly precipitated sludge are flocculated by mixingly adding thereto a flocculant, the treated water being separated from said flocculated sludge.

9. A process according to claim 3, wherein said lower density sludge is prepared by carrying out precipitation reactions at a high concentration.

10. A process according to claim 9 in which an initiating sludge is formed by mixing and reacting a concentrated solution containing aluminum sulfate with a concentrated precipitant sufficient to fully precipitate said aluminum sulfate, and during recycle of the sludge adding a relatively small quantity of said concentrated solution of aluminum sulfate and a larger quantity of raw liquid containing sufficient alkalinity to precipitate the aluminum sulfate until the predetermined high density is reached.

References Cited by the Examiner

UNITED STATES PATENTS

| | | | |
|---|---|---|---|
| 2,128,569 | 8/1938 | Velz | 210—46 |
| 2,179,246 | 11/1939 | Applebaum | 210—208 |
| 2,276,300 | 3/1942 | Green | 210—206 |
| 2,296,437 | 9/1942 | Green | 210—20 |
| 2,355,069 | 8/1944 | Green | 210—46 |
| 2,415,074 | 2/1947 | Clark et al. | 23—201 X |
| 2,528,879 | 11/1950 | Green | 210—208 X |

OTHER REFERENCES

"Separan 2610 in Water Treatment"—A publication of the Dow Chemical Co., Midland, Mich., October 1956, about 24 pages.

Behrman et al.: Ind. & Eng. Chem., vol. 31, February 1939, pp. 128–133.

MORRIS O. WOLK, *Primary Examiner.*